(12) United States Patent
Zhang et al.

(10) Patent No.: US 11,995,229 B2
(45) Date of Patent: May 28, 2024

(54) VEHICLE-MOUNTED DISPLAY ADJUSTMENT DEVICE AND VEHICLE

(71) Applicant: WUHAN CHINA STAR OPTOELECTRONICS TECHNOLOGY CO., LTD., Hubei (CN)

(72) Inventors: Shoudong Zhang, Hubei (CN); Suimang Song, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 761 days.

(21) Appl. No.: 16/973,374

(22) PCT Filed: Nov. 11, 2020

(86) PCT No.: PCT/CN2020/127942
§ 371 (c)(1),
(2) Date: Dec. 8, 2020

(87) PCT Pub. No.: WO2022/088254
PCT Pub. Date: May 5, 2022

(65) Prior Publication Data
US 2022/0317767 A1    Oct. 6, 2022

(30) Foreign Application Priority Data
Oct. 26, 2020  (CN) .......................... 202011152698.0

(51) Int. Cl.
*G06F 3/01*    (2006.01)
*B60K 35/00*   (2006.01)
(Continued)

(52) U.S. Cl.
CPC .............. *G06F 3/013* (2013.01); *B60K 35/00* (2013.01); *B60R 11/0229* (2013.01);
(Continued)

(58) Field of Classification Search
CPC ........ B60K 2370/149; B60K 2370/744; B60K 2011/0089; B60K 2011/0007;
(Continued)

(56) References Cited

U.S. PATENT DOCUMENTS

| 5,734,537 A | 3/1998 | Ono et al. |
| 2006/0164230 A1* | 7/2006 | DeWind ................. B60K 35/10 340/461 |

(Continued)

FOREIGN PATENT DOCUMENTS

| CN | 101226407 A | 7/2008 |
| CN | 102749991 A | 10/2012 |

(Continued)

*Primary Examiner* — James R Sheleheda

(57) ABSTRACT

The present disclosure provides a vehicle-mounted display adjustment device and a vehicle, including an adjustment unit and a control unit. Positions of human eyes are detected and located through a detection module in the control unit, and position information of the human eyes is sent to a control module in the control unit. The control module sends a control signal to the adjustment unit according to a gaze direction of the human eyes to drive the adjustment unit to adjust an angle of the vehicle-mounted display.

10 Claims, 3 Drawing Sheets

(51) Int. Cl.
  *B60K 35/10* (2024.01)
  *B60R 11/02* (2006.01)
  *G06V 20/59* (2022.01)
  *G06V 40/16* (2022.01)
  *G06V 40/18* (2022.01)
  *B60K 35/65* (2024.01)
  *B60R 11/00* (2006.01)

(52) U.S. Cl.
  CPC ............ *G06V 20/59* (2022.01); *G06V 40/171* (2022.01); *G06V 40/18* (2022.01); *B60K 35/10* (2024.01); *B60K 35/658* (2024.01); *B60K 2360/149* (2024.01); *B60R 2011/0007* (2013.01); *B60R 2011/0089* (2013.01)

(58) Field of Classification Search
  CPC ...... B60K 35/00; G06V 40/18; G06V 40/171; G06V 20/59; G06F 3/013; B60R 2011/0089; B60R 2011/0007
  See application file for complete search history.

(56) References Cited

U.S. PATENT DOCUMENTS

| | | | | |
|---|---|---|---|---|
| 2010/0053409 A1* | 3/2010 | Chang | ................... | G06F 1/1686 348/E5.022 |
| 2014/0139655 A1* | 5/2014 | Mimar | ............... | G08B 21/0476 340/575 |
| 2015/0138043 A1* | 5/2015 | Rawlinson | ............ | G06F 3/1454 345/2.2 |
| 2015/0138448 A1* | 5/2015 | Rawlinson | ............... | B60N 2/22 348/837 |
| 2015/0146359 A1* | 5/2015 | Katsunuma | ............ | B60K 35/00 361/679.22 |
| 2016/0101697 A1* | 4/2016 | Rawlinson | ............... | B60N 2/02 701/49 |
| 2016/0355091 A1* | 12/2016 | Lee | ........................... | B60R 1/00 |
| 2017/0060235 A1* | 3/2017 | Banyay | .............. | G02B 27/0093 |
| 2017/0232844 A1* | 8/2017 | Sugiyama | .............. | B60K 35/00 248/27.1 |
| 2018/0304749 A1* | 10/2018 | Cho | ........................ | B60K 35/00 |
| 2018/0370363 A1* | 12/2018 | Vinogradov | ........... | B60K 37/04 |
| 2019/0302457 A1* | 10/2019 | Kim | ........................ | B60K 35/22 |

FOREIGN PATENT DOCUMENTS

| | | | | |
|---|---|---|---|---|
| CN | 103359000 A | 10/2013 | | |
| CN | 109017602 A | 12/2018 | | |
| CN | 208311847 U | 1/2019 | | |
| CN | 109398243 A | 3/2019 | | |
| CN | 109712523 A | 5/2019 | | |
| CN | 110316078 A | 10/2019 | | |
| CN | 110316080 A | 10/2019 | | |
| CN | 110727316 A | 1/2020 | | |
| CN | 210510863 U | 5/2020 | | |
| CN | 111258414 A | 6/2020 | | |
| CN | 111717127 A | 9/2020 | | |
| EP | 2147614 A1 * | 1/2010 | ............... | A47C 7/62 |
| WO | 2020158034 A1 | 8/2020 | | |
| WO | 2020161954 A1 | 8/2020 | | |

* cited by examiner

VEHICLE-MOUNTED DISPLAY ADJUSTMENT DEVICE AND VEHICLE

BACKGROUND OF INVENTION

Field of Invention

The present disclosure relates to the field of vehicle-mounted display device technology, and specifically to a vehicle-mounted display adjustment device and a vehicle capable of realizing automatic adjustment of an angle of vehicle-mounted display.

Description of Prior Art

With increasing demand for human-computer interaction functions of vehicles, functions of vehicle-mounted displays have become increasingly abundant in recent years. Because of difference in sitting postures and viewing angles of vehicle personnel, in order to obtain the best viewing effect, an angle of vehicle-mounted display needs to be adjusted. However, it is inconvenient to adjust angles of existing vehicle-mounted displays, which will affect user experience and driving safety.

SUMMARY OF INVENTION

The present disclosure provides a vehicle-mounted display adjustment device and a vehicle, which is capable of adjusting an angel of the vehicle-mounted display automatically according to positions of human eyes.

To solve the above problems, the present disclosure provides technical solutions:

On one hand, embodiments of the present disclosure provide a vehicle-mounted display adjustment device, which comprises:
- an adjustment unit, wherein one end of the adjustment unit is fixedly connected to a vehicle-mounted display, and the other end is fixedly connected to a vehicle center console, and the adjustment unit is configured to drive the vehicle-mounted display to move; and
- a control unit, wherein the control unit is fixedly connected to the vehicle-mounted display, and the control unit is communicatively connected to the adjustment unit, the control unit is configured to detect positions of human eyes, determine a gaze direction of the human eyes, and drive the adjustment unit according to the gaze direction of the human eyes, in order to drive the vehicle-mounted display to move;
- wherein the control unit comprises a detection module and a control module, the detection module is communicatively connected to the control module, and the control module is communicatively connected to the adjustment unit;
- the detection module is configured to detect the positions of the human eyes and determine the gaze direction of the human eyes; and
- the control module comprises a central processing unit, a micro control unit, and a memory, and the control module is configured to drive the adjustment unit according to the gaze direction of the human eyes to drive the vehicle-mounted display to move.

In some embodiments, a plurality of display target positions and a plurality of target gaze directions are pre-stored in the control module, and the display target positions and the target gaze directions are in one to one correspondence;

the detection module is configured to obtain facial information of a person, and send the facial information to the control module;

the control module is configured to locate the positions of the human eyes according to the facial information, and determine the gaze direction of the human eyes;

the control module is further configured to compare the gaze direction of the human eyes with the plurality of target gaze directions after determining the gaze direction of the human eyes to find the target gaze direction that is same as the gaze direction of the human eyes, in order to determine the display target position; and the control module is further configured to obtain current position of the vehicle-mounted display, and drive the adjustment unit to drive the vehicle-mounted display to move to the display target position if the current position is inconsistent with the display target position.

In some embodiments, the detection module comprises a camera and a light source, wherein the detection module is configured to obtain human eye information by the camera and the light source, and send the human eye information to the control module, and the control module is configured to determine the gaze direction of the human eye according to the human eye information;

the control module is further configured to calculate an angle between a sight line of the camera and the gaze direction of the human eyes after determining the gaze direction of the human eyes; and the control module is further configured to drive the adjustment unit to adjust a position of the vehicle-mounted display according to the angle after calculating the angle between the sight line of the camera and the gaze direction of the human eyes.

In some embodiments, the camera is a wide dynamic camera.

In some embodiments, the control unit is integrated in the vehicle-mounted display.

In some embodiments, the adjustment unit comprises a display connection part, a center console connection part, and a motor group;

a first end of the display connection part is fixedly connected to the vehicle-mounted display, and a second end of the display connection part is hinged to the center console connection part;

a first end of the center console connection part is fixedly connected to the vehicle center console, and a second end of the center console connection part is hinged to the second end of the display connection part; and the motor group is fixedly connected to the display connection part and the center console connection part, respectively, and the motor group is configured to drive the display connection part and the center console connection part to rotate relative to each other;

wherein the motor group is configured to drive the center console connection part to rotate relative to the vehicle center console; and/or, the motor group is configured to drive the vehicle-mounted display to rotate relative to the display connection part.

In some embodiments, the display connection part and the center console connection part constitute a cross universal joint;

the center console connection part comprises a structural body and a base, the structural body is hinged to the display connection part, one end of the base is hinged to the structural body, and the other end of the base is fixedly connected to the vehicle center console; and the motor group comprises a first axis, a second axis, and a third axis that are perpendicular to each other, the first axis and the second axis respectively coincide with two rotating axes of the cross universal joint, wherein the motor group is configured to drive the display connection part to rotate around the first axis and the second axis relative to the structural body, and the motor group is configured to drive the structural body to rotate around the third axis relative to the base.

In some embodiments, the display connection part comprises a display connector and a first body, and the center console connection part comprises a center console connector and a second body;

one end of the display connector is fixedly connected to the vehicle-mounted display, the other end of the display connector is hinged to the first body, and one end of the center console connector is fixedly connected to the vehicle center console, the other end of the center console connector is hinged with the second body, and the first body and the second body are hinged;

the motor group is fixedly connected to the first body and the second body, respectively, the motor group is configured to drive the display connector to rotate relative to the first body around a first axis, the motor group is configured to drive the second body to rotate around a second axis relative to the center console connector, and the motor group is configured to drive the first body to rotate around a third axis relative to the second body; and the first axis, the second axis, and the third axis are perpendicular to each other.

On the other hand, embodiments of the present disclosure provide a vehicle-mounted display adjustment device, which comprises:

an adjustment unit, wherein one end of the adjustment unit is fixedly connected to a vehicle-mounted display, the other end is fixedly connected to a vehicle center console, and the adjustment unit is configured to drive the vehicle-mounted display to move; and a control unit, wherein the control unit is fixedly connected to the vehicle-mounted display, and the control unit is communicatively connected to the adjustment unit, wherein the control unit is configured to detect positions of human eyes, determine a gaze direction of the human eyes, and drive the adjustment unit according to the gaze direction of the human eyes, in order to drive the vehicle-mounted display to move.

In some embodiments, the control unit comprises a detection module and a control module, the detection module is communicatively connected to the control module, and the control module is communicatively connected to the adjustment unit;

the detection module is configured to detect the positions of the human eyes and determine the gaze direction of the human eyes; and the control module is configured to drive the adjustment unit according to the gaze direction of the human eyes to drive the vehicle-mounted display to move.

In some embodiments, a plurality of display target positions and a plurality of target gaze directions are pre-stored in the control module, and the display target positions and the target gaze directions are in one to one correspondence;

the detection module is configured to obtain facial information of a person, and send the facial information to the control module;

the control module is configured to locate the positions of the human eyes according to the facial information, and determine the gaze direction of the human eyes;

the control module is further configured to compare the gaze direction of the human eyes with the plurality of target gaze directions after determining the gaze direction of the human eyes to find the target gaze direction that is same as the gaze direction of the human eyes, in order to determine the display target position; and the control module is further configured to obtain current position of the vehicle-mounted display, and drive the adjustment unit to drive the vehicle-mounted display to move to the display target position if the current position is inconsistent with the display target position.

In some embodiments, the detection module comprises a camera and a light source, wherein the detection module is configured to obtain human eye information by the camera and the light source, and send the human eye information to the control module, and the control module is configured to determine the gaze direction of the human eyes according to the human eye information;

the control module is further configured to calculate an angle between a sight line of the camera and the gaze direction of the human eyes after determining the gaze direction of the human eyes; and the control module is further configured to drive the adjustment unit to adjust a position of the vehicle-mounted display according to the angle after calculating the angle between the sight line of the camera and the gaze direction of the human eyes.

In some embodiments, the camera is a wide dynamic camera.

In some embodiments, the control unit is integrated in the vehicle-mounted display.

In some embodiments, the control unit is outside the vehicle-mounted display.

In some embodiments, the adjustment unit comprises a display connection part, a center console connection part, and a motor group;

a first end of the display connection part is fixedly connected to the vehicle-mounted display, and a second end of the display connection part is hinged to the center console connection part;

a first end of the center console connection part is fixedly connected to the vehicle center console, and a second end of the center console connection part is hinged to the second end of the display connection part; and the motor group is fixedly connected to the display connection part and the center console connection part, respectively, and the motor group is configured to drive the display connection part and the center console connection part to rotate relative to each other;

wherein the motor group is configured to drive the center console connection part to rotate relative to the vehicle center console; and/or, the motor group is configured to drive the vehicle-mounted display to rotate relative to the display connection part.

In some embodiments, the display connection part and the center console connection part constitute a cross universal joint;

the center console connection part comprises a structural body and a base, the structural body is hinged to the display connection part, one end of the base is hinged to the structural body, and the other end of the base is fixedly connected to the vehicle center console; and the motor group comprises a first axis, a second axis, and a third axis that are perpendicular to each other, the first axis and the second axis respectively coincide with two rotating axes of the cross universal joint, wherein the motor group is configured to drive the display connection part to rotate around the first axis and the second axis relative to the structural body, and the motor group is configured to drive the structural body to rotate around the third axis relative to the base.

In some embodiments, the display connection part comprises a display connector and a first body, and the center console connection part comprises a center console connector and a second body;

one end of the display connector is fixedly connected to the vehicle-mounted display, the other end of the display connector is hinged to the first body, and one end of the center console connector is fixedly connected to the vehicle center console, the other end of the center console connector is hinged with the second body, and the first body and the second body are hinged;

the motor group is fixedly connected to the first body and the second body, respectively, the motor group is configured to drive the display connector to rotate relative to the first body around a first axis, the motor group is configured to drive the second body to rotate around a second axis relative to the center console connector, and the motor group is configured to drive the first body to rotate around a third axis relative to the second body; and the first axis, the second axis, and the third axis are perpendicular to each other.

In some embodiments, the motor group is composed of a plurality of servo motors.

On the other hand, embodiments of the present disclosure provide a vehicle comprising the vehicle-mounted display adjustment devices in the embodiments of the present disclosure.

The embodiment of the present disclosure provides a vehicle-mounted display adjustment device and a vehicle, which detect and locate the position of the human eyes through the detection module in the control unit, and sends the position information of the human eyes to the control module in the control unit. The control module determines the gaze direction of the human eyes according to the received position information of the human eyes, and sends a control signal to the adjustment unit according to the gaze direction of the human eyes, so as to drive the adjustment unit to drive the vehicle-mounted display to move, in order to achieve angle adjustment. Therefore, the angle of the vehicle-mounted display can be automatically adjusted according to the positions of the human eyes, so that people can obtain the best viewing effect, and the user experience is improved. At the same time, impact on driving safety caused by excessive head turning angle of the driver when viewing the vehicle-mounted display during driving, or the need to manually adjust the angle of the vehicle-mounted display, is reduced.

DESCRIPTION OF DRAWINGS

The following detailed description of the specific implementations of the present disclosure in conjunction with the accompanying drawings will make the technical solutions and other beneficial effects of the present disclosure obvious.

DETAILED DESCRIPTION OF PREFERRED EMBODIMENTS

Figure 1:
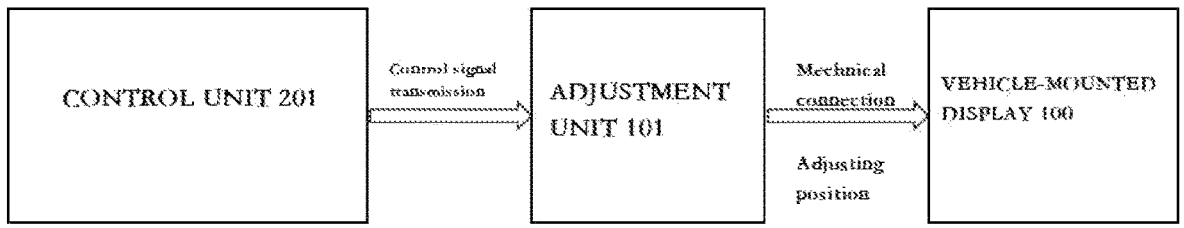
FIG. 1 is a schematic diagram of principle of a vehicle-mounted display adjustment device according to an embodiment of the present disclosure.

Technical solutions in embodiments of the present disclosure will be clearly and completely described below in conjunction with drawings in the embodiments of the present disclosure. It is clear that the described embodiments are part of embodiments of the present disclosure, but not all embodiments. Based on the embodiments of the present disclosure, all other embodiments to those of ordinary skill in the premise of no creative efforts obtained, should be considered within the scope of protection of the present disclosure.

In the description of the present disclosure, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", and "counter-clockwise" are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present disclosure. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

In the description of the present disclosure, it should be noted that unless otherwise clearly defined and limited, the terms "mounted", "connected/coupled", and "connection" should be interpreted broadly. For example, the terms may refer to a fixed connection, a detachable connection, or an integral connection; the terms may also refer to a mechanical connection, an electrical connection, or communication with each other; the terms may further refer to a direct connection, an indirect connection through an intermediary, or an interconnection between two elements or interactive relationship between two elements. Those skilled in the art can understand the specific meanings of the above-mentioned terms in the present disclosure according to circumstances.

In the present disclosure, it should he noted that unless otherwise clearly defined and limited, a first feature "on" or "under" a second feature may mean that the first feature directly contacts the second feature, or that the first feature contacts the second feature via an additional feature there between instead of directly contacting the second feature. Moreover, the first feature "on", "above", and "over" the second feature may mean that the first feature is right over or obliquely upward over the second feature or mean that the first feature has a horizontal height higher than that of the second feature. The first feature "under", "below", and "beneath" the second feature may mean that the first feature is right beneath or obliquely downward beneath the second feature or mean that that horizontal height of the first feature is lower than that of the second feature.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, applications of other processes and/or other materials may be appreciated those skilled in the art.

The present disclosure provides a vehicle-mounted display adjustment device and a vehicle, detailed description are made as follows, respectively.

Figure 5:
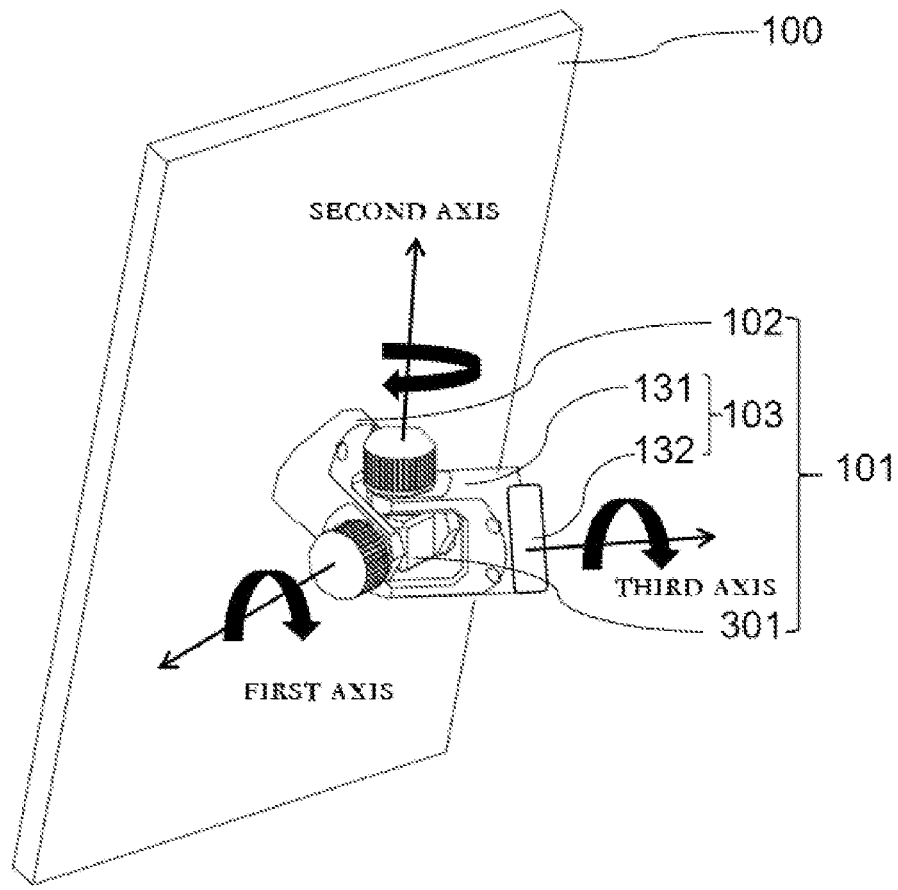
FIG. 5 is a schematic structural diagram of the vehicle-mounted display adjustment device according to an embodiment of the present disclosure.

First, an embodiment of the present disclosure provides a vehicle-mounted display adjustment device. As shown in FIG. 1 and FIG. 5, the vehicle-mounted display adjustment device comprises an adjustment unit 101 and a control unit 201 (not shown in FIG. 5). One end of the adjustment unit 101 is fixedly connected to the vehicle-mounted display 100, and the other end is fixedly connected to a vehicle center console (not shown in FIG. 5), and the adjustment unit 101 is configured to drive the vehicle-mounted display 100 to move.

The control unit 201 is fixedly connected to the vehicle-mounted display 100 and can move synchronously with the vehicle-mounted display 100. The control unit 201 is communicatively connected to the adjustment unit 101. The control unit 201 is configured to detect positions of human eyes, determine a gaze direction of the human eyes, and send a control signal to the adjustment unit 101 to drive the adjustment unit 101 according to the gaze direction of the human eyes, in order to drive the vehicle-mounted display to move.

In an embodiment of the present disclosure, the control unit 201 detects and locates the positions of the human eyes, and determines the gaze direction of human eyes through the positions of the human eyes. The control unit 201 sends a control signal to the adjustment unit 101 according to the gaze direction of the human eyes to drive the adjustment unit 101 to drive the vehicle-mounted display 100 to move, thereby realizing angle adjustment. Therefore, an angle of the vehicle-mounted display can be automatically adjusted according to the positions of the human eyes, which improves the user experience. At the same time, impact on driving safety caused by excessive head turning angle of the driver when viewing the vehicle-mounted display during driving, or the need to manually adjust the angle of the vehicle-mounted display, is reduced.

Figure 2:
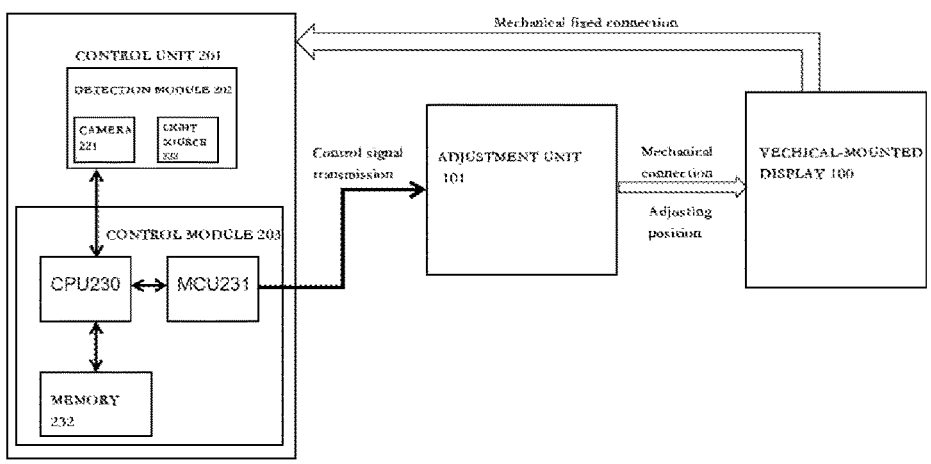
FIG. 2 is a schematic diagram of principle of a vehicle-mounted display adjustment device according to another embodiment of the present disclosure.

In some embodiments of the present disclosure, as shown in FIG. 2, the control unit 201 comprises a detection module 202 and a control module 203. The detection module 202 is communicatively connected to the control module 203. The detection module 202 is configured to obtain facial information of a person, and send the facial information to the control module 203. The control module 203 locates the positions of the human eyes according to the facial information, and then further locates iris positions according to the positions of the human eyes.

In some embodiments of the present disclosure, after the detection module 202 obtains the facial image information of the person, the positions of the human eyes are located in the facial region through template matching methods, grayscale projection methods, Gabor-based wavelet transform methods and other methods, and then the iris positions are located according to the positions of the human eyes. After the positions of the human eyes are located, firstly, the left and right human eye regions are segmented for morphological processing to obtain the left and right human eye regions with smoother boundary regions after morphological filtering, and then contour tracking methods are used to extract edge points of eye contours, and contour ellipses of the left and right human eye regions are combined, and then a canny edge detection algorithm is used to obtain a clear edge information of the human eye regions, and positions of iris are located through a Hough transform. Finally, by comparing coordinates of eye contour centers and coordinates of iris centers, the gaze direction of the human eyes is obtained.

The control module 203 pre-stores a plurality of display target positions and a plurality of target gaze directions, and the display target positions and target gaze directions correspond one-to-one. Among them, the target gaze directions need to be determined by the preset human eye positions. The preset human eye positions are obtained by counting the distribution of eye positions in the body space coordinate system when the driver and co-pilot of different body shapes sit on the seat in different postures. The target gaze directions are determined by factors such as height, sitting height, sitting eye height, head deflection angle, human head size, human eye position, eye deflection angle and other factors. In the embodiment of the present disclosure, the target gaze directions comprise possible gaze directions of most people sitting in the main driver's seat or the passenger's seat. In order to obtain the best viewing effect, the plane of the display should be perpendicular to the gaze direction of the human eyes, so that the target position of the display is the position of the display when the plane of the display is perpendicular to the target gaze direction.

In some embodiments of the present disclosure, after the detection module 202 obtains the facial image information of the person, the facial image information is sent to the control module 203. The control module 203 locates the positions of the eyes and the iris, and then calculates the gaze direction of the eyes. The control module 203 compares the gaze direction of the human eyes with the target gaze direction, and determines the target position of the display corresponding to the gaze direction of the human eyes. After the target position of the display is determined, the control module 203 compares the target position of the display with the acquired current position of the display. If the two are inconsistent, the control module 203 sends a control signal to the adjustment unit 101 to drive the adjustment unit 101 to drive the vehicle-mounted display to move to the target position of the display. The current position of the display can be obtained through the position sensor provided in the control unit 201.

In some embodiments of the present disclosure, as shown in FIG. 2, the detection module 202 is connected to the control module 203, and the detection module 20 sends the facial image information of the person to the control module 203 after the facial image information of the person is obtained. The control module 203 comprises a central processing unit CPU230, a microcontroller unit MCU231, and a memory 232. The CPU230 can communicate with the MCU 231 and the memory 232 through serial ports. In the embodiment of the present disclosure, the detection module 202 may be a wide-field camera.

The central processing unit CPU230 performs calculation processing on the facial image information of the person, and calculates the gaze direction of the human eyes. The memory 232 pre-stores the plurality of target positions of the display and the plurality of target gaze directions. The central processing unit CPU230 determines the target position of the display according to the comparison of the gaze direction of the human eyes and the target gaze direction. The central processing unit CPU230 is configured to obtain the current positon of the display of the vehicle-mounted display 100, and judge whether the current position of the display is consistent with the target position of the display, and then send the judgment result to the microcontroller MCU231.

The microcontroller unit MCU231 is connected to the adjustment unit 101. The microcontroller unit MCU231 is configured to output a control signal to the adjustment unit 101 according to the judgment result sent by the central processing unit CPU230. If the current position of the display is inconsistent with the target position of the display, a first control signal is output to the adjustment unit 101 to drive the vehicle-mounted display 100 to rotate to the same position to the target position of the display through the adjustment unit 101. If the current position of the display is consistent with the target position of the display, a second control signal is output to the adjustment unit 101, the adjusting unit 101 does not work and keeps the vehicle-mounted display 100 at the current position.

Figure 3:
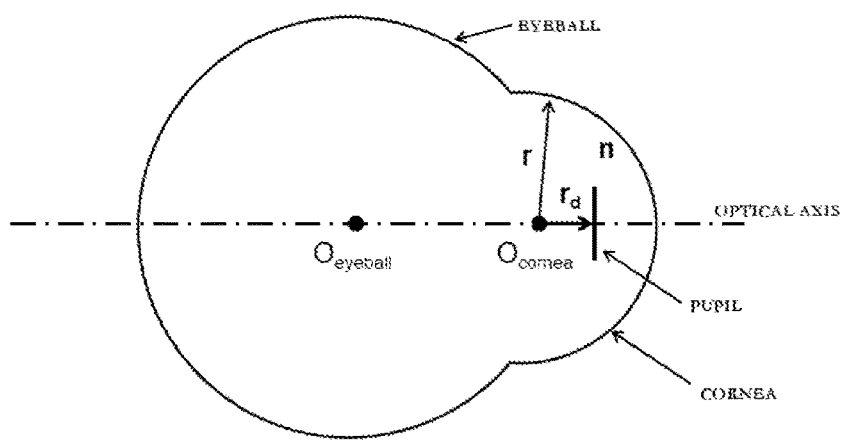
FIG. 3 is a schematic diagram of a simplified eye model.

In order to more accurately determine the sight line direction of the human eyes, in some embodiments of the present disclosure, as shown in FIG. 2, the detection module 202 comprises a camera 221 and a light source 222, and the detection module 202 obtains the gaze direction of the human eyes through pupil-corneal reflection technology. The human eye is a complex optical instrument, and is a coaxial optical system composed of multiple interfaces. In gaze tracking, human eyes are usually simplified and approximated. The embodiment of the present disclosure takes Emsley's simplified eye as a simplified model of an eyeball. As shown in FIG. 3, $O_{cornea}$ is a center of a cornea, $O_{eyeball}$ is a center of eyeball rotation, r is a radius of the cornea, $r_d$ is a distance between the pupil center and the center of the cornea, and n is a refractive index of contents of the eyeball. Emsley's simple eye simplifies the complex human eye to an optical structure with only one refractive interface while maintaining the basic optical properties. Then, after determining three-dimensional coordinates of the corneal center and the pupil center on the optical axis of the human eyes, the gaze direction of the human eyes can be estimated by determining an optical axis of an eyeball symmetry.

Figure 4:
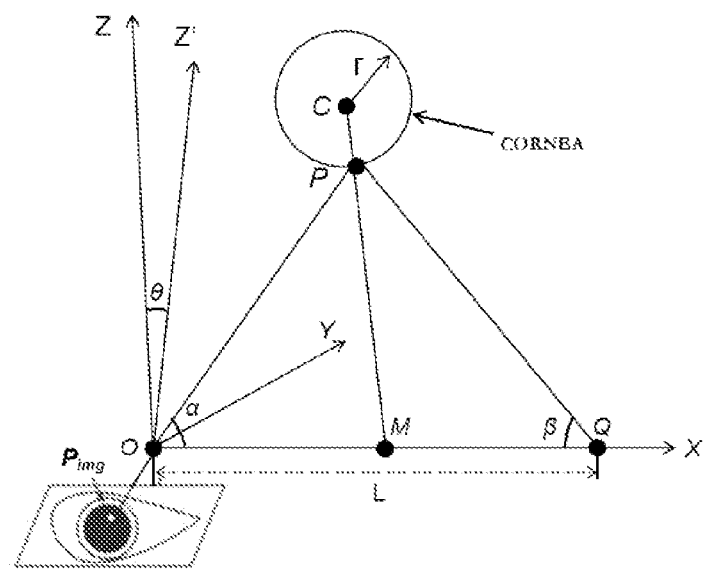
FIG. 4 is a schematic diagram of near-infrared light reflection.

As shown in FIG. 4, O is an optical center of a camera, Q is a LED point light source, C is the center of the cornea, L is a distance from the optical center to the point light source, r is the corneal radius, P is a light reflection point on the corneal surface; $P_{img}$ is a first image of Putin. A three-dimensional coordinate system OXYZ and a two-dimensional auxiliary coordinate system XOZ' are established as shown in the figure above, where optical center of the camera O is an origin, the X axis is a connection direction of the optical center and the point light source, the Z axis is an optical axis of the camera, and the Y axis is perpendicular to XOY plane upwards. The upward direction perpendicular to the X axis in the OPQ plane is the Z axis. An angle between the XYZ plane and the XOZ' plane is a θ.

According to the reflection law of convex spherical mirror: five points of the light source Q, the optical center O, the spherical center C, the reflection point P, and the image point $P_{img}$ are coplanar, and CM is an angular bisector of ∠OPQ. In the two-dimensional auxiliary coordinate system XOZ', there are the following triangular relations:

$$\alpha = \cos^{-1}\left(\frac{-\overrightarrow{OP_{img}} \cdot \overrightarrow{OQ}}{\|\overrightarrow{OP_{img}}\| \cdot \|\overrightarrow{OQ}\|}\right) \quad (1)$$

$$\beta = \tan^{-1}\left(\frac{x_p \cdot \tan\alpha}{\|\overrightarrow{OQ}\| - x_p}\right) \quad (2)$$

According to the above triangular relationship, in the auxiliary plane XOZ', the corneal center coordinate expression is:

$$\begin{pmatrix} C_x \\ C_z' \end{pmatrix} = \begin{pmatrix} x_p - r \cdot \sin\left(\frac{\alpha - \beta}{2}\right) \\ x_p \cdot \tan\alpha + r \cdot \cos\left(\frac{\alpha - \beta}{2}\right) \end{pmatrix} \quad (3)$$

The two-dimensional auxiliary coordinate system XOZ' is rotated around the X axis by θ to coincide with the XOZ plane. Then, under the premise that image coordinates of the first image point $P_{img}$, the distance L and the corneal radius r are known, a three-dimensional coordinate expression of the corneal center can be obtained by the geometric relationship:

$$\begin{pmatrix} C_x \\ C_y \\ C_y \end{pmatrix} = \begin{pmatrix} x_p - r \cdot \sin\frac{\alpha - \beta}{2} \\ \left(x_p \cdot \tan\alpha + r \cdot \cos\frac{\alpha - \beta}{2}\right)\sin\theta \\ \left(x_p \cdot \tan\alpha + r \cdot \cos\frac{\alpha - \beta}{2}\right)\cos\theta \end{pmatrix} \quad (4)$$

Wherein, $\theta = \tan^{-1}(Y_{pimg}/Z_{pimg})$.

The above equation can also be regarded as a spatial curve parameter equation passing through the corneal center C and taking $x_p$ as a parameter. Then, using the camera and the light source, the three-dimensional coordinates of the corneal center, that is, the intersection of the spatial curves, can be determined. After obtaining the three-dimensional coordinates of the corneal center, three-dimensional coordinates of the pupil center can be obtained by using the distance parameter between the pupil and the corneal center in the simplified eye model, and finally the gaze direction of the human eye can be obtained through the optical axis linear equation.

The detection module 202 uses the pupil corneal reflection technology to determine the gaze direction of the human eyes, and then sends the gaze direction information of the human eyes to the control module 203, and the control module 203 calculates the angle between the sight line of the camera and the gaze direction of the human eyes. The sight line of the camera is a line on which the optical axis of the camera is located. The control module 203 can drive the adjustment unit 101 to adjust the position of the vehicle-mounted display 100 until the line on which the eye gaze direction is located coincides with the line on which the optical axis of the camera is located.

In order to obtain the best viewing effect, the plane of the vehicle-mounted display 100 should be perpendicular to the gaze direction of the human eye, and the line on which the gaze direction of the human eyes is located passes through the plane center of the vehicle-mounted display 100. Considering that the camera in the detection module 202 is generally located at the edge of the vehicle-mounted display 100, when the line on which the gaze direction of the human eyes is located coincides with the line on which the optical axis of the camera is located, the line on which the gaze direction of the human eyes is located does not pass through the display. The angle between the gaze direction of the human eye and the sight line of the camera, when the line of the gaze direction of the human eye is perpendicular to the plane of the vehicle-mounted display 100 and passes through the center of the plane, is calculated according to the size of the vehicle-mounted display 100 and the position of the camera 221 on the vehicle-mounted display 100. The angle can be used as a target angle, and the control module 203 can drive the adjustment unit 101 to adjust the position of the vehicle-mounted display 100 until the angle between the gaze direction of the human eyes and the sight line of the camera is consistent with the target angle.

When the light in the vehicle is dark, the image of the human eyes acquired by the detection module 202 will be unclear, which affects the determination of the gaze direction of the human eyes. In some embodiments of the present disclosure, the camera 221 in the detection module 202 is a wide dynamic camera, which can obtain a clear image of the human eyes even in a dark environment.

In some embodiments of the present disclosure, the control unit 201 is integrated into the vehicle-mounted display 100, which reduces the space occupied, while ensuring that the detection module 202 in the control unit 201 can move synchronously with the vehicle-mounted display 100, and ensuring that the vehicle-mounted display 100 can be adjusted to the best viewing angle. It is understandable that the control unit 201 may not be integrated in the vehicle-mounted display 100. For example, the control unit 201 can be externally mounted on the vehicle-mounted display 100 and fixedly connected to the vehicle-mounted display 100 to ensure that the control unit 201 can move with the vehicle-mounted display 100, which is not limited here.

Figure 6:
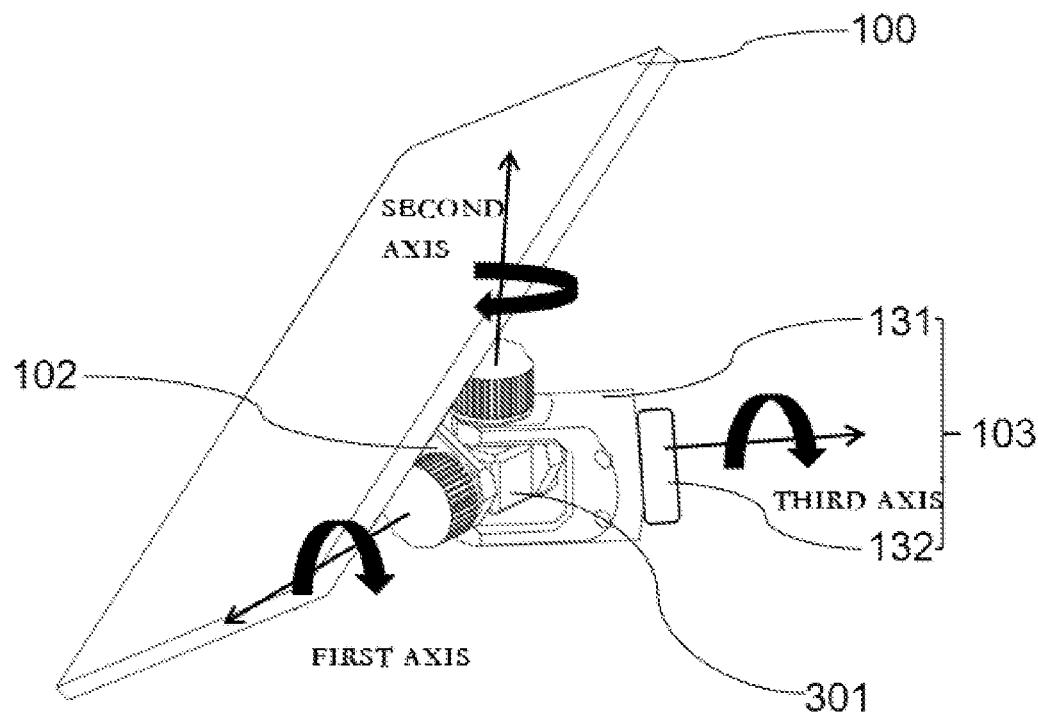
FIG. 6 is a schematic diagram of the vehicle-mounted display adjustment device at another adjustment angle provided in the present disclosure.

In some embodiments of the present disclosure, as shown in FIG. 5 and FIG. 6, the display connection part 102 and the center console connection part 103 form a cross universal joint structure. The center console connection part 103 comprises a structural body 131 and a base 132. The structural body 131 is hinged to the display connecting part 102. One end of the base 132 is hinged to the structural body 131, and the other end of the base 132 is fixed connected to the vehicle center console (not shown in the figures).

The motor group 301 is fixedly connected to the display connection part 102 and the center console connection part 103 respectively. The motor group 301 comprises a plurality of motors. The motor group 301 comprises three rotating axes, including a first axis, a second axis, and a third axis perpendicular to each other. The first axis and the second axis are coincident with the two rotating axes of the universal joint respectively. Combined with FIGS. 5 and 6, the motor group 301 can drive the display connection part 102 to rotate relative to the structural body 131 around the first axis and the second axis, and the motor unit can also drive the structural body 131 to rotate relative to the base 132 around the third axis, thereby realizing the angle adjustment of the vehicle-mounted display 100.

It should be noted that in addition to adjust angle through rotation, the motor unit can also have a function of adjusting position through translation. For example, a device similar to a slide rail can be disposed between the base 132 and the vehicle center console (not shown in the figure), to realize the translational movement of the vehicle-mounted display 100 relative to the vehicle center console coordinated with the drive of the motor, and the vehicle-mounted display 100 can be more conveniently adjusted to a position that can obtain the best viewing effect coordinated with the rotation to adjust angle.

Figure 7:
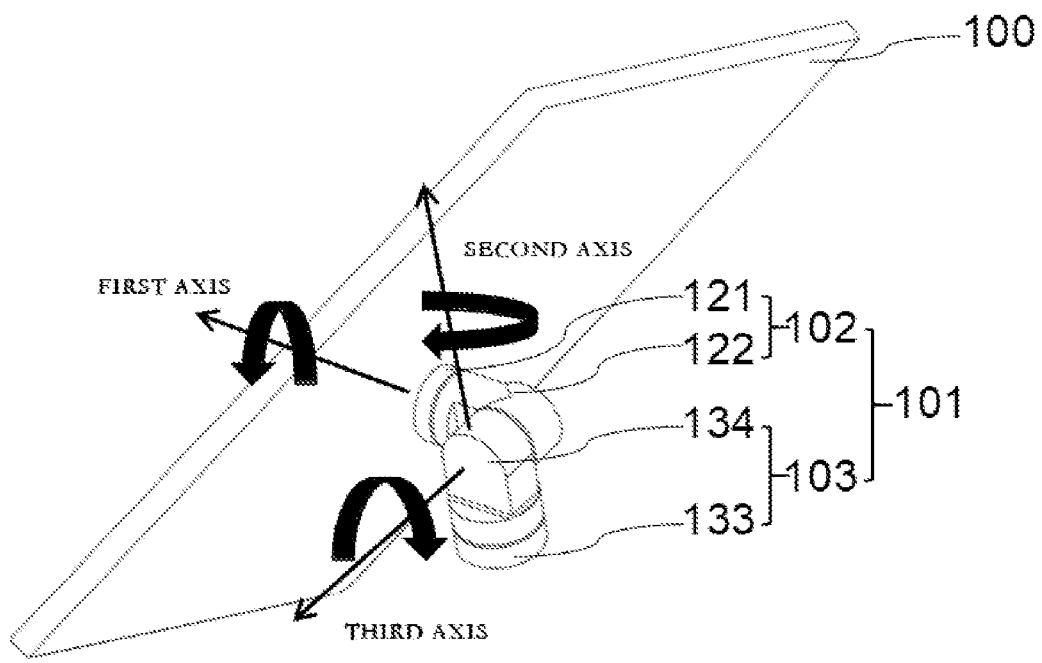
FIG. 7 is a schematic structural diagram of the vehicle-mounted display adjustment device according to another embodiment of the present disclosure.

In some embodiments of the present disclosure, as shown in FIG. 7, the display connection part 102 comprises a display connector 121 and a first body 122, and the center console connection part 103 comprises a center console connector 133 and a second body 134. One end of the display connector 121 is fixedly connected to the vehicle-mounted display 100, the other end of the display connector 121 is hinged to the first body 122. One end of the center console connector 133 is fixedly connected to the vehicle center console (not shown), and the other end of the center console connector 133 is hinged to the second body 134, and the first body 122 and the second body 134 are hinged.

The motor group is fixedly connected to the first body 122 and the second body 134, respectively. The motor group (not shown in the figure) comprises a plurality of motors. The motor group can drive the display connector 121 to rotate relative to the first body 122 around the first axis, can drive the second body 134 to rotate relative to the center console connector 133 around the second axis, and can drive the first body 122 to rotate relative to the second body 134 around the third axis, wherein the first axis, the second axis, and the third axis are perpendicular to each other. Through the above structural arrangement, three mutually perpendicular motor axes are used to control the angle adjustment in three directions respectively, so that the angle adjustment of the vehicle-mounted display 100 is realized, and the structure is simple and the space occupied is small.

In some embodiments of the present disclosure, the plurality of motors in the motor group are servo motors, which have high adjustment accuracy and can make the angle adjustment of the vehicle-mounted display 100 more accurate.

The embodiments of the present disclosure also provide a vehicle, comprising the vehicle-mounted display 100 provided in the above-mentioned embodiments. The vehicle may be a fuel vehicle, an electric vehicle, or a hybrid vehicle, which is not limited here.

The embodiment of the present disclosure detects and locates the position of the human eyes through the detection module in the control unit, and sends the position information of the human eyes to the control module in the control unit. The control module determines the gaze direction of the human eyes according to the received position information of the human eyes, and sends a control signal to the adjustment unit according to the gaze direction of the human eyes, so as to drive the adjustment unit to drive the vehicle-mounted display to move, in order to achieve angle adjustment. Therefore, the angle of the vehicle-mounted display can be automatically adjusted according to the positions of the human eyes, so that people can obtain the best viewing effect, and the user experience is improved. At the same time, impact on driving safety caused by excessive head turning angle of the driver when viewing the vehicle-mounted display during driving, or the need to manually adjust the angle of the vehicle-mounted display, is reduced.

The above is a detailed introduction to a vehicle-mounted display adjustment device and the vehicle provided in the embodiments of the present disclosure. Specific examples are used in this article to illustrate the principles and implementations of the present disclosure. The descriptions of the above embodiments are only used to help understand the methods and core ideas of the present disclosure. At the same time, for those skilled in the art, according to the ideas of the present disclosure, there will be changes in the specific implementation and scope of the present disclosure. In summary, the content of this specification should not be construed as a limitation.

What is claimed is:

1. A vehicle-mounted display adjustment device, comprising:

an adjustment unit, wherein one end of the adjustment unit is fixedly connected to a vehicle-mounted display, and the other end is fixedly connected to a vehicle center console, and the adjustment unit is configured to drive the vehicle-mounted display to move; and a control unit, wherein the control unit is fixedly connected to the vehicle-mounted display, and the control unit is communicatively connected to the adjustment unit, the control unit is configured to detect positions of human eyes, determine a gaze direction of the human eyes, and drive the adjustment unit according to the gaze direction of the human eyes, in order to drive the vehicle-mounted display to move;

wherein the control unit comprises a detection module and a control module, the detection module is communicatively connected to the control module, and the control module is communicatively connected to the adjustment unit;

the detection module is configured to detect the positions of the human eyes and determine the gaze direction of the human eyes; and the control module comprises a central processing unit, a micro control unit, and a memory, and the control module is configured to drive the adjustment unit according to the gaze direction of the human eyes to drive the vehicle-mounted display to move;

wherein a plurality of display target positions and a plurality of target gaze directions are pre-stored in the control module, and the display target positions and the target gaze directions are in one to one correspondence, the detection module is configured to obtain facial information of a person, and send the facial information to the control module, the control module is configured to:
locate the positions of the human eyes according to the facial information,
determine the gaze direction of the human eyes,
compare the gaze direction of the human eyes with the plurality of target gaze directions after determining the gaze direction of the human eyes to find the target gaze direction that is same as the gaze direction of the human eyes, in order to determine the display target position, and
obtain current position of the vehicle-mounted display, and drive the adjustment unit to drive the vehicle-mounted display to move to the display target position if the current position is inconsistent with the display target position.

2. The vehicle-mounted display adjustment device of claim 1, wherein the detection module comprises a camera and a light source, wherein the detection module is configured to obtain human eye information by the camera and the light source, and send the human eye information to the control module, and the control module is configured to determine the gaze direction of the human eye according to the human eye information;

the control module is further configured to calculate an angle between a sight line of the camera and the gaze direction of the human eyes after determining the gaze direction of the human eyes; and the control module is further configured to drive the adjustment unit to adjust a position of the vehicle-mounted display according to the angle after calculating the angle between the sight line of the camera and the gaze direction of the human eyes.

3. The vehicle-mounted display adjustment device of claim 2, wherein the camera is a wide dynamic camera.

4. The vehicle-mounted display adjustment device of claim 1, wherein the control unit is integrated in the vehicle-mounted display.

5. The vehicle-mounted display adjustment device of claim 1, wherein the adjustment unit comprises a display connection part, a center console connection part, and a motor group;

a first end of the display connection part is fixedly connected to the vehicle-mounted display, and a second end of the display connection part is hinged to the center console connection part;

a first end of the center console connection part is fixedly connected to the vehicle center console, and a second end of the center console connection part is hinged to the second end of the display connection part; and the motor group is fixedly connected to the display connection part and the center console connection part, respectively, and the motor group is configured to drive the display connection part and the center console connection part to rotate relative to each other;

wherein the motor group is configured to drive the center console connection part to rotate relative to the vehicle center console; and/or, the motor group is configured to drive the vehicle-mounted display to rotate relative to the display connection part.

6. The vehicle-mounted display adjustment device of claim 5, wherein the display connection part and the center console connection part constitute a cross universal joint;

the center console connection part comprises a structural body and a base, the structural body is hinged to the display connection part, one end of the base is hinged to the structural body, and the other end of the base is fixedly connected to the vehicle center console; and the motor group comprises a first axis, a second axis, and a third axis that are perpendicular to each other, the first axis and the second axis respectively coincide with two rotating axes of the cross universal joint, wherein the motor group is configured to drive the display connection part to rotate around the first axis and the second axis relative to the structural body, and the motor group is configured to drive the structural body to rotate around the third axis relative to the base.

7. The vehicle-mounted display adjustment device of claim 5, wherein the display connection part comprises a display connector and a first body, and the center console connection part comprises a center console connector and a second body;

one end of the display connector is fixedly connected to the vehicle-mounted display, the other end of the display connector is hinged to the first body, and one end of the center console connector is fixedly connected to the vehicle center console, the other end of the center console connector is hinged with the second body, and the first body and the second body are hinged;

the motor group is fixedly connected to the first body and the second body, respectively, the motor group is configured to drive the display connector to rotate relative to the first body around a first axis, the motor group is configured to drive the second body to rotate around a second axis relative to the center console connector, and the motor group is configured to drive the first body to rotate around a third axis relative to the second body; and the first axis, the second axis, and the third axis are perpendicular to each other.

8. The vehicle-mounted display adjustment device of claim 5, wherein the motor group is composed of a plurality of servo motors.

9. The vehicle-mounted display adjustment device of claim 1, wherein the control unit is outside the vehicle-mounted display.

10. A vehicle comprising a vehicle-mounted display adjustment device, comprising:

an adjustment unit, wherein one end of the adjustment unit is fixedly connected to a vehicle-mounted display, and the other end is fixedly connected to a vehicle center console, and the adjustment unit is configured to drive the vehicle-mounted display to move; and a control unit, wherein the control unit is fixedly connected to the vehicle-mounted display, and the control unit is communicatively connected to the adjustment unit, the control unit is configured to detect positions of human eyes, determine a gaze direction of the human eyes, and drive the adjustment unit according to the gaze direction of the human eyes, in order to drive the vehicle-mounted display to move;

wherein the control unit comprises a detection module and a control module, the detection module is communicatively connected to the control module, and the control module is communicatively connected to the adjustment unit;

the detection module is configured to detect the positions of the human eyes and determine the gaze direction of the human eyes; and the control module comprises a central processing unit, a micro control unit, and a memory, and the control module is configured to drive the adjustment unit according to the gaze direction of the human eyes to drive the vehicle-mounted display to move;

wherein a plurality of display target positions and a plurality of target gaze directions are pre-stored in the control module, and the display target positions and the target gaze directions are in one to one correspondence, the detection module is configured to obtain facial information of a person, and send the facial information to the control module, the control module is configured to:
  locate the positions of the human eyes according to the facial information,
  determine the gaze direction of the human eyes,
  compare the gaze direction of the human eyes with the plurality of target gaze directions after determining the gaze direction of the human eyes to find the target gaze direction that is same as the gaze direction of the human eyes, in order to determine the display target position, and
  obtain current position of the vehicle-mounted display, and drive the adjustment unit to drive the vehicle-mounted display to move to the display target position if the current position is inconsistent with the display target position.

* * * * *